UNITED STATES PATENT OFFICE.

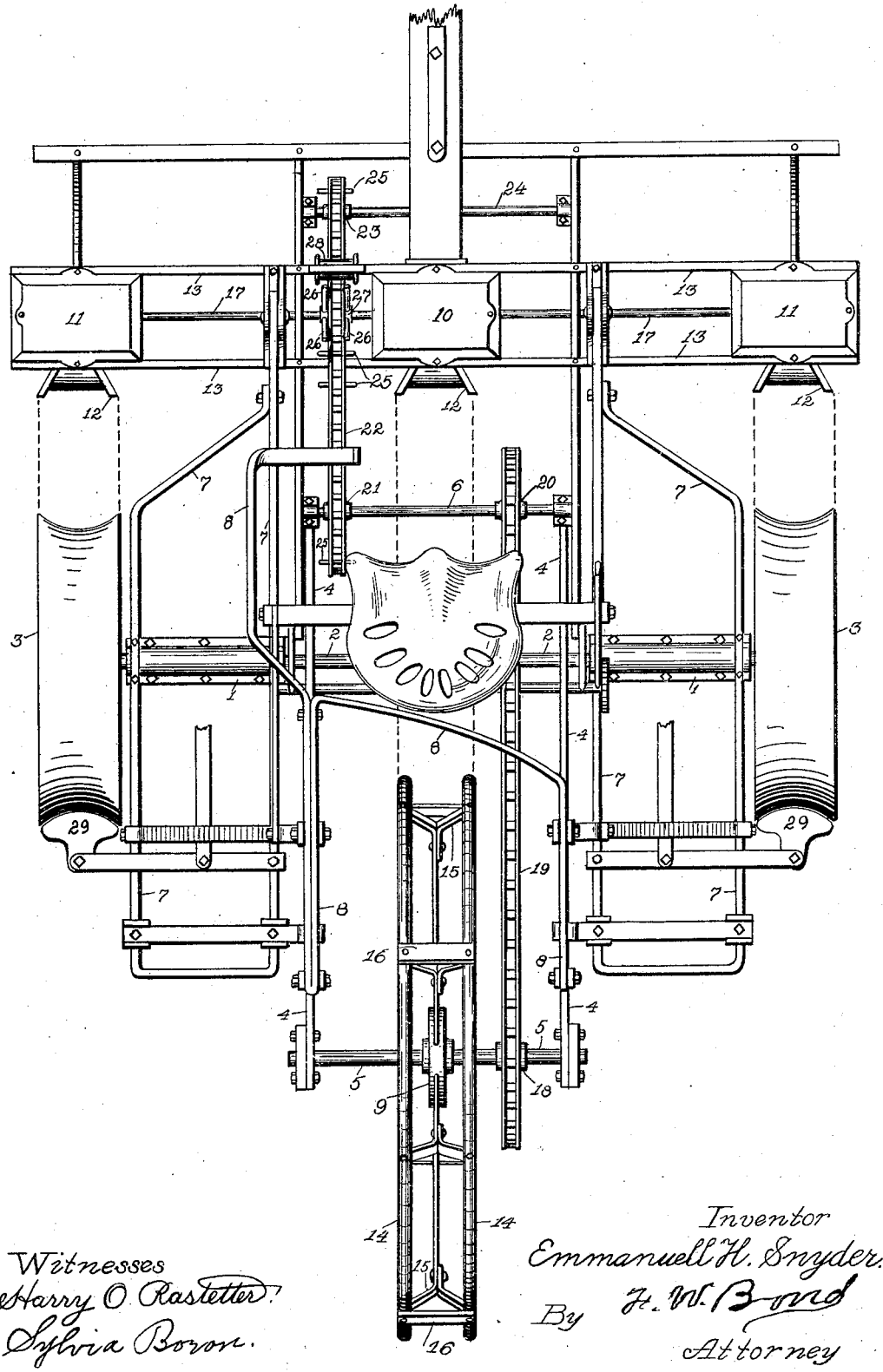

EMMANUELL H. SNYDER, OF CANTON, OHIO.

CORN-PLANTER.

No. 845,203.  Specification of Letters Patent.  Patented Feb. 26, 1907.

Application filed January 4, 1907. Serial No. 350,729.

*To all whom it may concern:*

Be it known that I, EMMANUELL H. SNYDER, a citizen of the United States, residing at Canton, in the county of Stark and State of Ohio, have invented certain new and useful Improvements in Corn-Planters; and I do hereby declare that the following is a full, clear, and exact description of the same, reference being had to the annexed drawing, making a part of this specification, and to the numerals and figures of reference marked thereon, in which the figure of the drawing is a top plan view showing the different parts properly arranged with reference to each other.

The present invention has relation to corn-planters designed to plant three rows of grain at a time; and it consists in the novel arrangement hereinafter described, and particularly pointed out in the claims.

In the accompanying drawing, which is a plan view of the machine, 1 represents the axle-bearings, which bearings are secured in any convenient and well-known manner to the frame of the planter proper, in which bearings is journaled the main axle 2, upon which axle is mounted the bearing and covering wheels 3, which parts within themselves form no particular part of the present invention. The parallel bars 4 extend a short distance forward of the axle and extend rearward and are for the purpose of holding in proper spaced relation the axle 5 and shaft 6. The bars 4 may be continuous, or they may be made in separate pieces and connected together.

For the purpose of providing means for attaching the various parts of the planter the side frames 7 are provided, which side frames are substantially of the form shown and may be connected in any convenient and well-known manner; but the part constituting the frame within itself does not enter into the present invention to any extent, and hence no detailed description is necessary.

For the purpose of elevating and adjusting the frame the foot-lever 8 is provided, which foot-lever is properly connected and is operated in the usual manner. Upon the shaft 5 is mounted the combined covering, marker, and drop-mechanism-operating wheel 9, which is located directly in the rear of the center or middle row dropping-box 10, and upon either side of the middle dropping-box 10 are located the dropping-boxes 11, which dropping-boxes are provided with the usual mechanism for dropping the grain, (not illustrated,) so that it will find its way through ordinary dropping-spouts, which are located in rear of the runners or furrow-openers 12, which are of the usual construction.

For the purpose of supporting the dropping-boxes 10 and 11, together with the different parts connected and belonging thereto, the frame 13 is provided, which frame is attached to the main frame in any convenient and well-known manner. The combined covering, marker, and grain-dropper-mechanism-operating wheel 9 is preferably formed of two tires 14, spaced apart and held in proper spaced relationship with reference to each other by the connecting-yokes 15, which yokes are connected to the body or hub of the wheel proper. Upon the tires 14 are located the marker-blocks 16, which marker-blocks serve the double purpose of marking and preventing any slipping of the wheels, by which arrangement a positive motion is imparted to the shaft 17, which shaft is for the purpose of communicating motion to the dropper mechanism as the planter-frame is moved over the ground in the usual manner.

It will be understood that by providing the marker-blocks they will serve the purpose of the common check lines or wires and the grain can be planted in straight rows in opposite directions.

Upon the axle 5 is mounted the sprocket-wheel 18, from which leads the sprocket-chain 19 to and around the sprocket-wheel 20, which sprocket-wheel is mounted on the shaft 6. Upon the shaft 6 is mounted the sprocket-wheel 21, from which sprocket-wheel leads the chain 22 to and around the sprocket-wheel 23, which sprocket-wheel is mounted upon the shaft 24. The chain 22 is provided with the laterally-extending lugs 25, which are for the purpose of engaging the arms 26, which arms are fixed to the wheel 27, which wheel is securely mounted upon the shaft 17. It will be understood that when motion is imparted to the chain 22 intermittent rotary motion will be imparted to the shaft 17, thereby imparting an intermittent motion to the dropping mechanism, located in the usual manner in the dropper-boxes 10 and 11, and of course the ordinary mechanism is employed for operatively connecting the dropper-plates to the intermittent shaft 17.

For the purpose of holding the upper member of the drive-chain 22 in proper relationship with the arms 26 the roller-idler 28 is provided, which roller is journaled directly above the chain 22. In the drawing I have illustrated wheel-scraper blades 29, which are connected and operated in the usual manner.

The marker-blocks 16 serve the double purpose of marking at right angles to the travel of the frame and to actuate the grain-dropping mechanism through the mechanism located intermediate the operating-wheel and the grain-dropping mechanism.

Having fully described my invention, what I claim as new, and desire to secure by Letters Patent, is—

1. In a three-row planter, a frame mounted upon bearing-wheels, said frame carrying seedboxes, a marker-wheel journaled in a frame at the rear of the center or middle seedbox, the axle of said marker-wheel carrying a sprocket-wheel, a sprocket-chain engaging a sprocket-wheel on a shaft midway of the frame, a second sprocket-wheel on said shaft, a sprocket-chain engaging a sprocket-wheel on a forward shaft for operating the seed-feeding devices, substantially as and for the purposes specified.

2. In a corn-planter, a frame mounted upon bearing-wheels, said frame carrying seed-boxes, a marker-wheel journaled in a frame at the rear of the center or middle seedbox, the axle of said marker-wheel carrying a sprocket-wheel, a sprocket-chain engaging a sprocket-wheel on a shaft midway of the frame, a second sprocket-wheel on said shaft, a sprocket-chain engaging a sprocket-wheel on a forward shaft for operating the seed-feeding devices, substantially as and for the purposes specified.

3. In a three-row planter, a frame mounted upon bearing-wheels, said frame carrying seedboxes, a marker-wheel journaled in a frame at the rear of the center or middle seedbox, the axle of said marker-wheel carrying a sprocket-wheel, a sprocket-chain engaging a sprocket-wheel on a shaft midway of the frame, a second sprocket-wheel on said shaft, a sprocket-chain engaging a sprocket-wheel on a forward shaft, said chain provided with lugs, a seed-dropping shaft provided with arms, and the lugs on the chain adapted for actuating the arms upon the seed-dropping shaft, substantially as and for the purposes specified.

4. In a corn-planter, a frame mounted upon bearing-wheels, said frame carrying seed-boxes, a marker-wheel mounted upon an axle, said axle journaled in a frame at the rear of the seedboxes, a sprocket-wheel mounted upon the marker-wheel axle, a sprocket-chain engaging a sprocket-wheel on a shaft midway of the frame, a second sprocket-wheel on said shaft, a sprocket-chain engaging a sprocket-wheel on a forward shaft, said chain provided with lateral lugs, a seed-dropping shaft provided with arms, and the lateral lugs upon the sprocket-chain adapted for engagement with the arms upon the seed-dropping shaft, substantially as and for the purposes specified.

In testimony that I claim the above I have hereunto subscribed my name in the presence of two witnesses.

EMMANUELL H. SNYDER.

Witnesses:
J. A. JEFFERS,
SYLVIA BOEON.